(12) United States Patent
Sharp et al.

(10) Patent No.: US 6,638,583 B1
(45) Date of Patent: Oct. 28, 2003

(54) METHOD AND APPARATUS FOR LAMINATING STACKS OF POLYCARBONATE FILMS

(75) Inventors: Gary D. Sharp, Boulder, CO (US); Warren D. Slafer, Arlington, MA (US)

(73) Assignee: ColorLink, Inc., Boulder, CO (US)

( * ) Notice: Subject to any disclaimer, the term of this patent is extended or adjusted under 35 U.S.C. 154(b) by 0 days.

(21) Appl. No.: 09/559,267

(22) Filed: Apr. 27, 2000

(51) Int. Cl.⁷ .............................................. C09K 19/00
(52) U.S. Cl. ....................... 428/1.5; 428/1.62; 428/412; 428/414; 428/415; 428/426
(58) Field of Search ................ 428/1.5, 1.62, 428/412, 414, 415, 426

(56) References Cited

U.S. PATENT DOCUMENTS

| | | | | |
|---|---|---|---|---|
| 4,536,063 A | * | 8/1985 | Southwell | 359/488 |
| 5,472,538 A | * | 12/1995 | Minakuchi et al. | 156/229 |
| 5,571,567 A | * | 11/1996 | Shah | 427/379 |
| 5,751,384 A | | 5/1998 | Sharp | 349/18 |
| 5,888,603 A | | 3/1999 | Fergason | 428/46 |
| 5,990,996 A | | 11/1999 | Sharp | 349/119 |
| 6,004,417 A | * | 12/1999 | Roesch et al. | 156/155 |
| 6,096,375 A | * | 8/2000 | Ouderkirk et al. | 427/163.1 |
| 6,156,433 A | * | 12/2000 | Hatori et al. | 428/411.1 |

FOREIGN PATENT DOCUMENTS

WO    WO 00/07172    2/2000

* cited by examiner

Primary Examiner—James J. Seidleck
Assistant Examiner—Travis B Ribar
(74) Attorney, Agent, or Firm—Baker & McKenzie (57) ABSTRACT

A film welding apparatus is provided for solvent welding a first film to a second film. The apparatus has a movable backing surface adapted to support the first film, a pressing roller adapted to press the second film against the first film, and a solvent dispenser adapted to dispense a solvent between the first and second films.

52 Claims, 7 Drawing Sheets

METHOD AND APPARATUS FOR LAMINATING STACKS OF POLYCARBONATE FILMS

BACKGROUND OF THE INVENTION

1. Field of the Invention

The invention relates to the field of film bonding. More particularly, the invention relates to the field of bonding a plurality of polycarbonate films to each other.

2. Background of the Related Art

Alternative methods for bonding polycarbonates to polycarbonates, or to other substrates, are currently used in the photonics industry. A broad range of adhesive products, such as epoxies and silicones, have been developed for the optics industry. Urethanes are also used in the ballistic glass industry for bonding polycarbonate to glass.

SUMMARY OF THE INVENTION

An object of the invention is to solve at least the above problems and/or disadvantages and to provide at least the advantages described hereinafter.

According to the present invention, film stacks are fabricated using solvent welding techniques. An example of such a stack is a polycarbonate retarder stack. Solvents are disclosed which provide high peel strength, and effectively eliminate the optical interface between the substrates. The result is a monolithic structure that is free from internal reflections.

It is an object of the invention to identify a class of solvents that provides adequate working time. Exemplary solvents effectively weld the films together, providing a monolithic structure, without significantly effecting the optical properties of the retarder.

It is a further object of the invention to identify a fabrication process that uses inexpensive solvents in small quantity, is free of cleaning processes, is free of curing processes, and is free of extensive post processing such as autoclaving to remove bubbles (as required with pressure-sensitive adhesives).

It is a further object of the invention to provide a process that yields a high optical level of performance. Multilayer solvent welded stacks have extremely low specular reflection and haze between substrates, maximizing throughput and minimizing stray light. By contrast, adhesives must have a refractive index that is well matched to the substrate in order to attain an acceptable level of performance.

The inventive process also provides stacks with low wavefront distortion. The lack of adhesive with significant optical thickness between layers helps insure that light passing through the stack has minimal distortion. Provided that the substrate is of sufficient quality, stacks with 10–20 layers are sufficiently flat and rigid that they can be used in a free-standing mode.

It is a further object of the invention to produce retarder stacks with a high degree of durability. With polycarbonates only, rather than alternating layers of retarder and adhesive, the basic adhesive specifications, as well as issues of adhesive compatibility with the substrate, are non-issues. When an adhesive is used, concerns include adhesion, optical clarity (typically due to blue absorption), tendency to yellow with illumination, haze, refractive index, hardness (i.e. stress on film), environmental properties, curing process, and viscosity. Requirements in each of these categories greatly diminish the number of usable products, and in some cases no products satisfy specifications for the finished stack product.

In the invention, the lack of a foreign material between substrates eliminates concerns regarding coadhesion, the difference in coefficient of thermal expansion, and tendency for the adhesive to attack (craze or crack) the substrate. Surface treatments such as adhesion promoter or corona treatment to obtain adequate bond strength are also eliminated.

It is a further object of the invention to provide a film stack having a first film and a second film solvent welded to the first film.

An additional object of the invention is to provide a film welding apparatus for solvent welding a first film to a second film. The apparatus has a movable backing surface adapted to support the first film, a pressing roller adapted to press the second film against the first film, and a solvent dispenser adapted to dispense a solvent between the first and second films.

An additional object of the invention is to provide a method of fabricating a film stack from a first film and a second film. The method includes supporting the first film, pressing the second film against the first film, and solvent welding the second film to the first film with a solvent.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Although the invention is applicable to film stacks in general, the invention will be described with reference to an example involving stacks of retarder films.

There are several applications for retarder stacks, including but not limited to, achromatic compound retarders, achromatic rotators, LCD compensation, color polarizers, passive color filters (RGB, CMY, color enhancement, and color balance), sequential color filters, stacked-panel reflective/transmissive displays, and filtering, polarization control, polarization dispersion compensation, and gain flattening in telecommunication applications. One way to assemble retarder stacks is to use pressure-sensitive adhesives. In general, however, pressure-sensitive adhesives do not represent the least expensive method for assembling stacks. Furthermore, pressure-sensitive adhesives can introduce a number of problems that are not inherent to their essential function.

Pressure-sensitive adhesives are generally acrylics with a refractive index of roughly 1.44–1.48. The polycarbonate retarder film usually has an index of 1.59–1.60. As a result each additional film produces two interfaces with a power loss of approximately 0.4%. A stack containing 16 layers shows a pure reflection loss of 6.2%, and a sequential color filter with 46 films has a loss of 16.8%. These numbers may vary with wavelength depending upon the relative dispersion of the pressure-sensitive adhesive and the substrate.

In addition to reflection, any inhomogeneaties in the pressure-sensitive adhesive contribute to haze that can significantly increase loss and depolarization. In the blue frequency range, the as-laminated film can have a scatter component that is comparable to the reflection loss. Autoclaving is useful for removing bubbles, although there typically remains a significant haze contribution. Stray light from reflection/random scatter can degrade the performance of optical systems in a number of ways. First, any such losses impact the throughput of the system. In a reflection-mode system, distributed back-reflections can also reduce contrast/dynamic range. In a stack with several layers, the forward leakage from multiple reflections can actually become significant. In the event that approximately 10% (for example, 20 films @ ½% each) of combined first-reflection occurs, reflection forward of 10% of the 10% refracted back contributes a significant fraction of 1% to loss in transmitted contrast.

Pressure-sensitive adhesive material intended for direct view applications, such as that from Nitto Denko, has environmental specifications that are less stringent than pressure-sensitive adhesive used in projection systems. The former fails typical projection environmental tests for humidity, and heat/humidity. As such, biaxial stretched film polycarbonate (NRZ) product used in projection must be supplied without adhesive, and a more durable adhesive must be applied. Currently, pressure sensitive adhesives from very few vendors, such as Polatechno, appear to meet projection environmental requirements.

Another effect of pressure-sensitive adhesives is associated with the significant optical thickness of each adhesive layer. Nonuniformities in pressure-sensitive adhesive thickness can produce an accumulated loss in wavefront quality with the loss increasing with the number of layers.

Optimum LCD compensation schemes call for continuous structures to provide high contrast at a low f-number. A fairly good approximation to such a structure can be achieved using a small number of retarder films. However, with the availability of liquid crystal polymer films, polycarbonate compensation schemes must become more sophisticated in order to attain a similar level of performance. As such, low loss, low cost, durable methods for fabricating stacked retarder systems are necessary. Solvent bonding is an attractive method for laminating partial assemblies, which can be supplied to an equipment manufacturer (including a polarizer) with an external pressure-sensitive adhesive layer.

In addition to compensation, there are a number of new display modes that use retarder films for generating color. A reflection-mode stacked-panel display can be fabricated by inserting retarder stacks on either side of LCD panels, each operating on one additive primary band, such as the display described in U.S. Pat. No. 5,990,996, which is hereby incorporated by reference in its entirety. Reflections from each pressure-sensitive adhesive layer can significantly reduce the attainable contrast ratio. In contrast, the index matched stacking provided by solvent welding can greatly improve the attainable contrast ratio.

In a sequential projection system, a liquid crystal based color switch, such as the switch described in U.S. Pat. No. 5,990,996, which is hereby incorporated by reference in its entirety, should provide performance comparable to that of a rotating filter wheel (>90%). Such a device can have upwards of 50 film layers to achieve overall performance. Using pressure-sensitive adhesive, the filter cannot be competitive with the filter wheel. This neglects unavoidable losses from transparent conductors required to switch the LC cells. Thus, solvent welding is an enabling technology for providing zero-reflection stacks economically.

Figure 1:
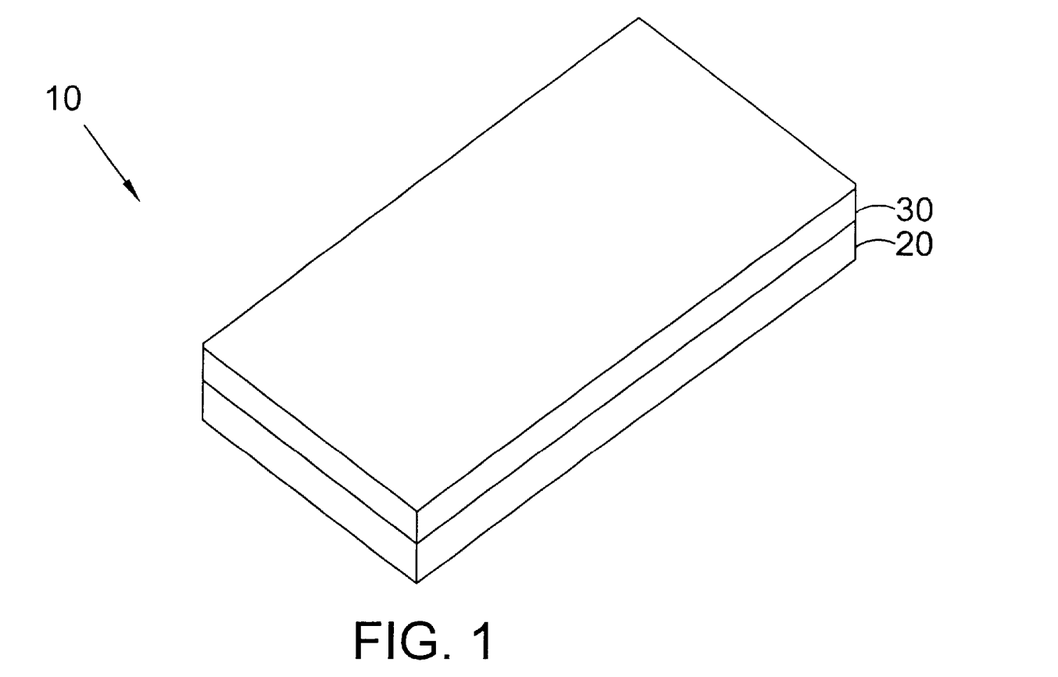
FIG. 1 shows an example of a film stack according to a first embodiment of the invention.
Figure 2:
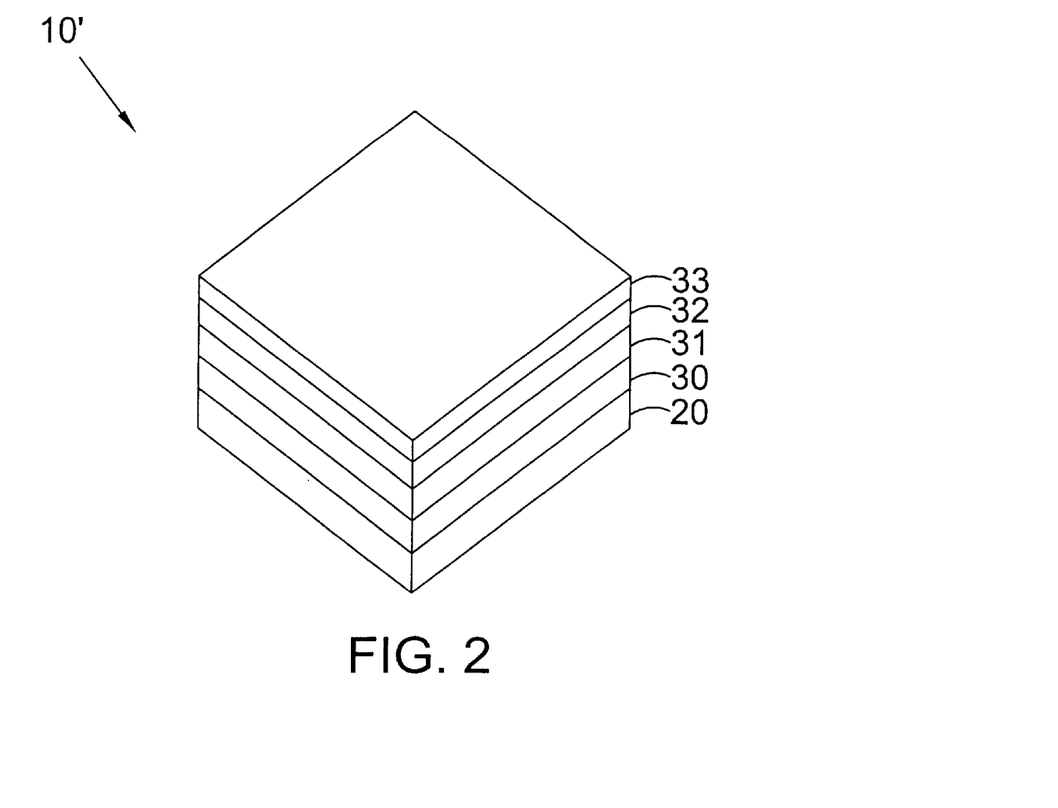
FIG. 2 shows a second example of a film stack according to the first embodiment of the invention.

A film stack produced by solvent welding is shown in FIG. 1. The film stack 10 in this example includes first film 20 solvent welded to second film 30. Although FIG. 1, and much of the discussion that follows, involves a film stack having only two films, it should be recognized that film stacks having any practical number of films can be produced. For example, FIG. 2 shows a film stack 10' with five films, first film 20, second film 30, third film 31, fourth film 32, and fifth film 33.

While many solvents can be used to weld two films together, solvents that produce stress-curl free, haze free optical bonds (no cracking/crazing), high peel strength, no mottle/texture (both in retardation and wavefront distortion), and insignificant relaxation in retardation are preferred. Another desirable feature in a solvent is a low health hazard and no need for extensive infrastructure for storage and handling. A secondary issue among the solvents with desirable characteristics is the ability to easily drive excess solvent from the completed laminate via a simple bake.

Examples of parameters that can effect the resulting film stack are as follows: (1) solvent type and purity, (2) solvent shot size, (3) solvent dilution type and concentration, (4) percentage/type of solids (doping of solvent), (5) lamination rate, (6) laminating roller pressure, (7) laminating roller diameter, and (8) laminating roller hardness.

Figure 3:
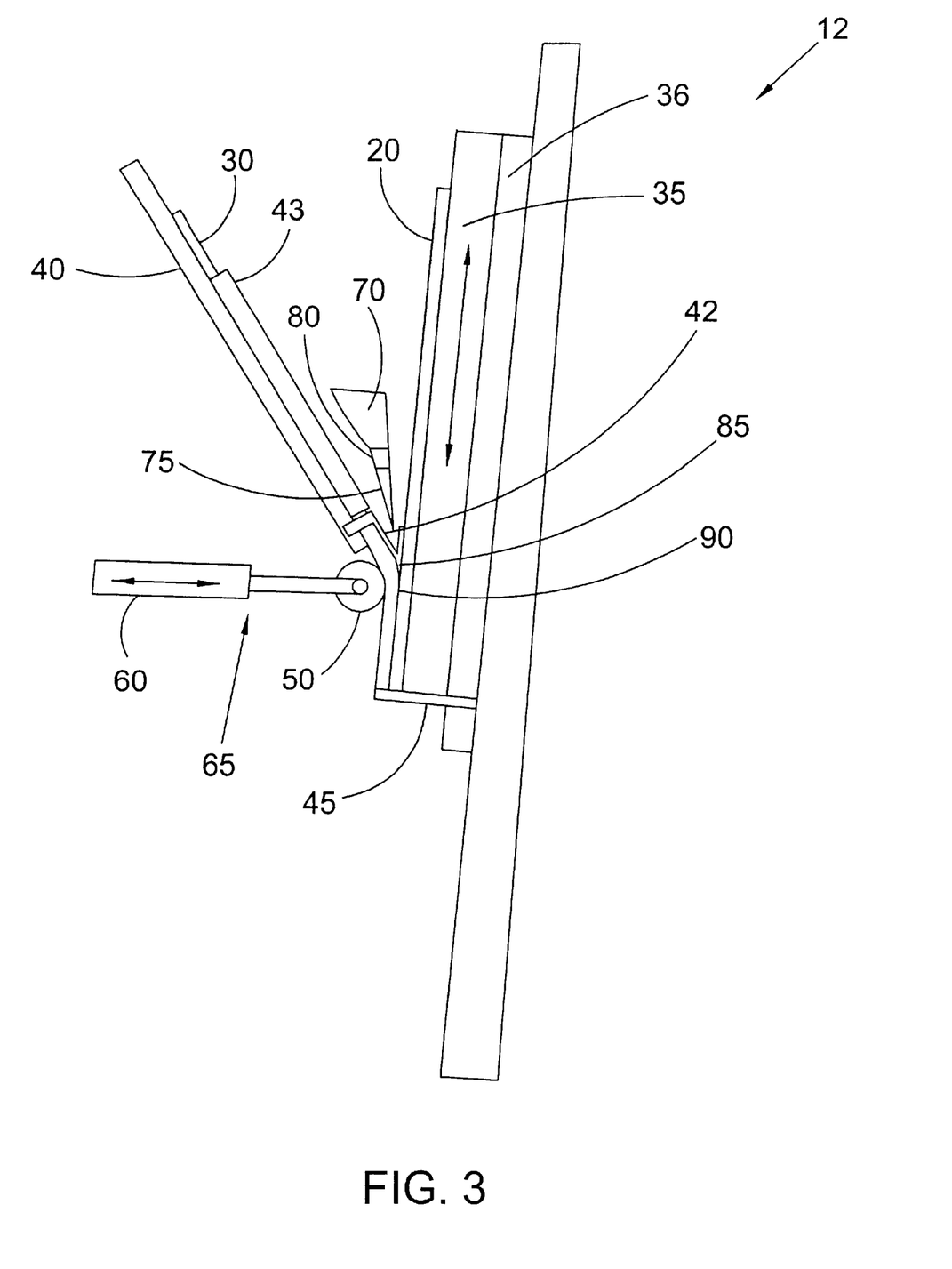
FIG. 3 shows an example of a film welding apparatus and method according to a second embodiment of the invention.
Figure 4:
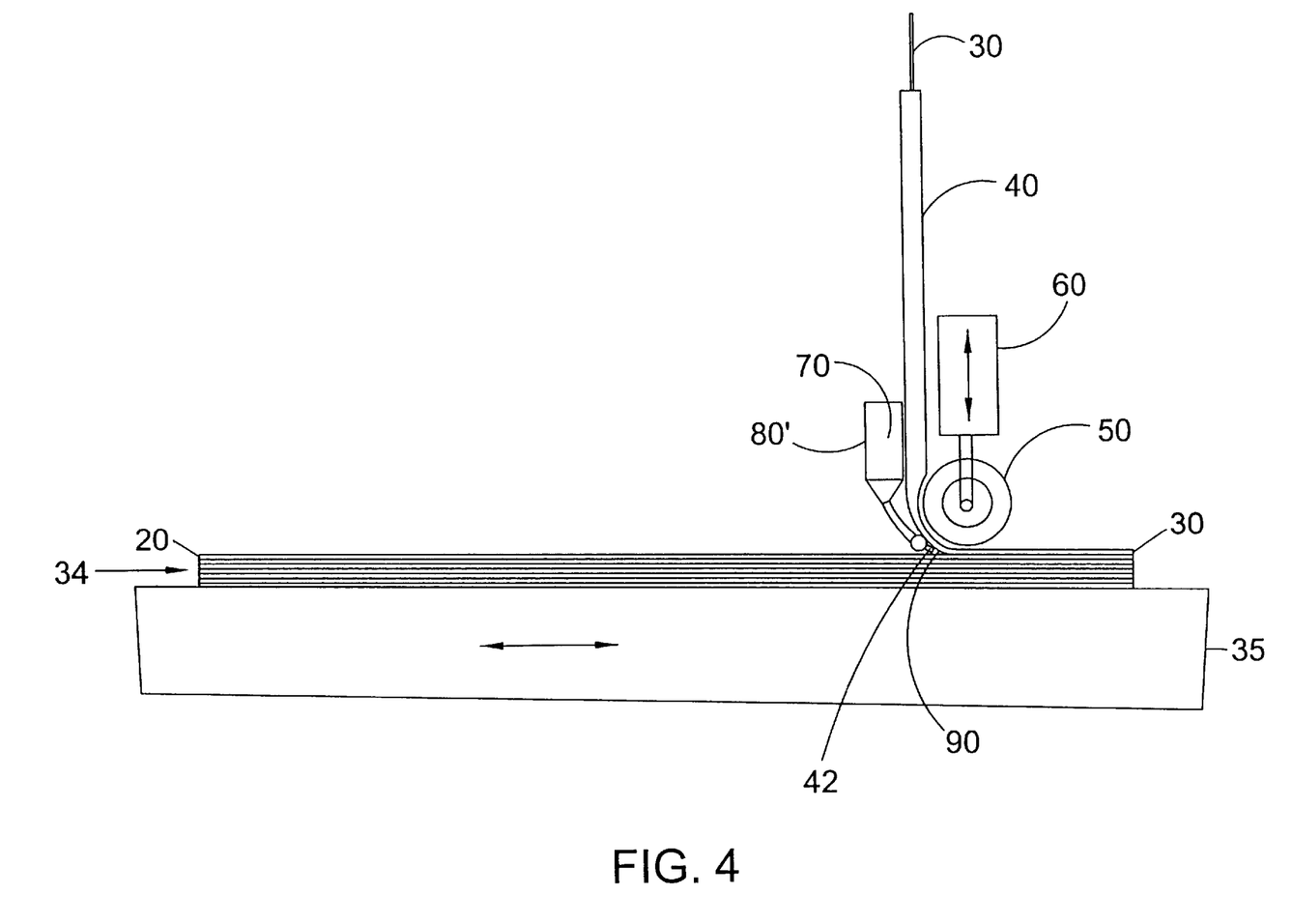
FIG. 4 shows an example of a film welding apparatus and method according to a third embodiment of the invention.
Figure 5:
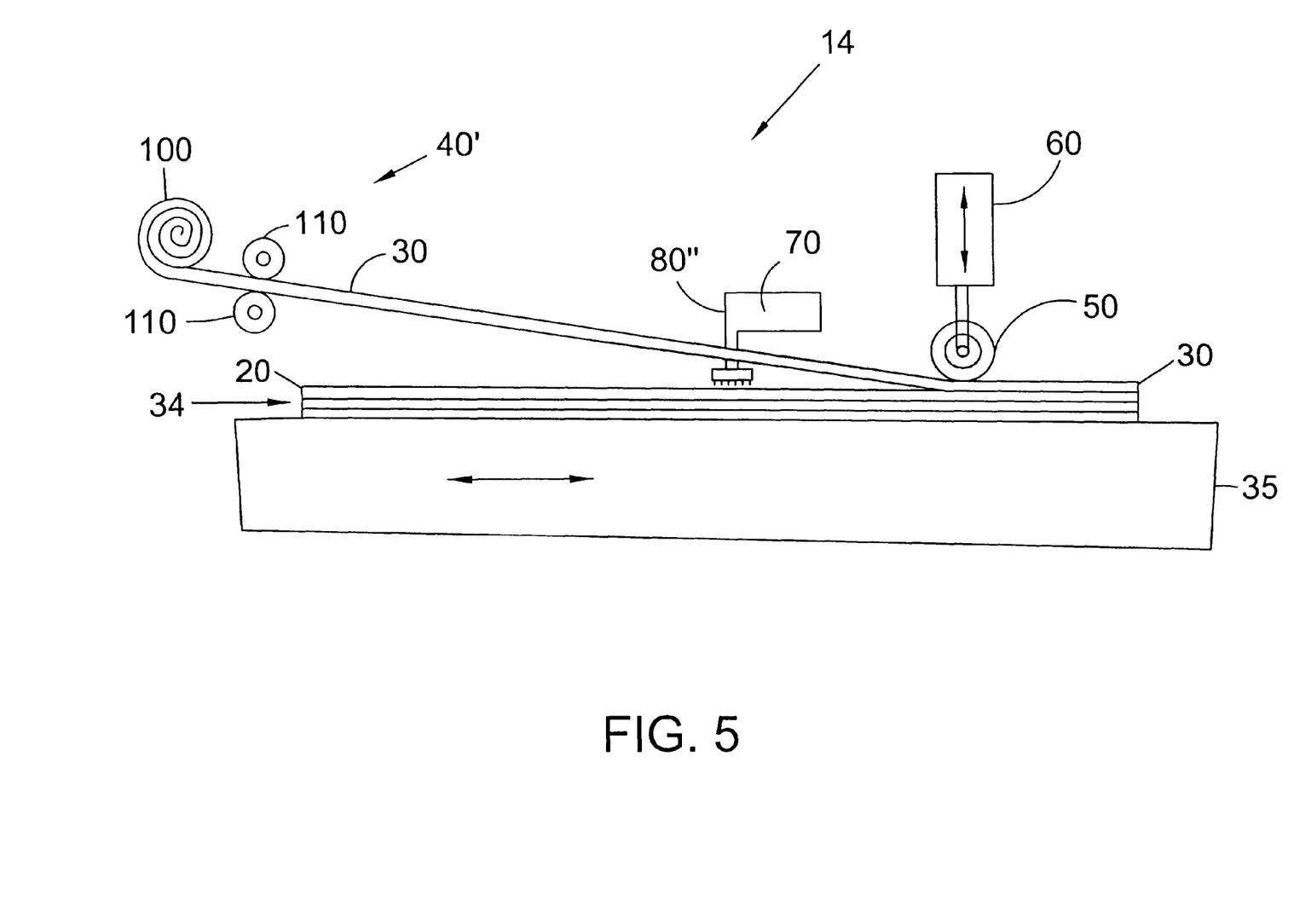
FIG. 5 shows an example of a film welding apparatus and method according to a fourth embodiment of the invention.
Figure 6:
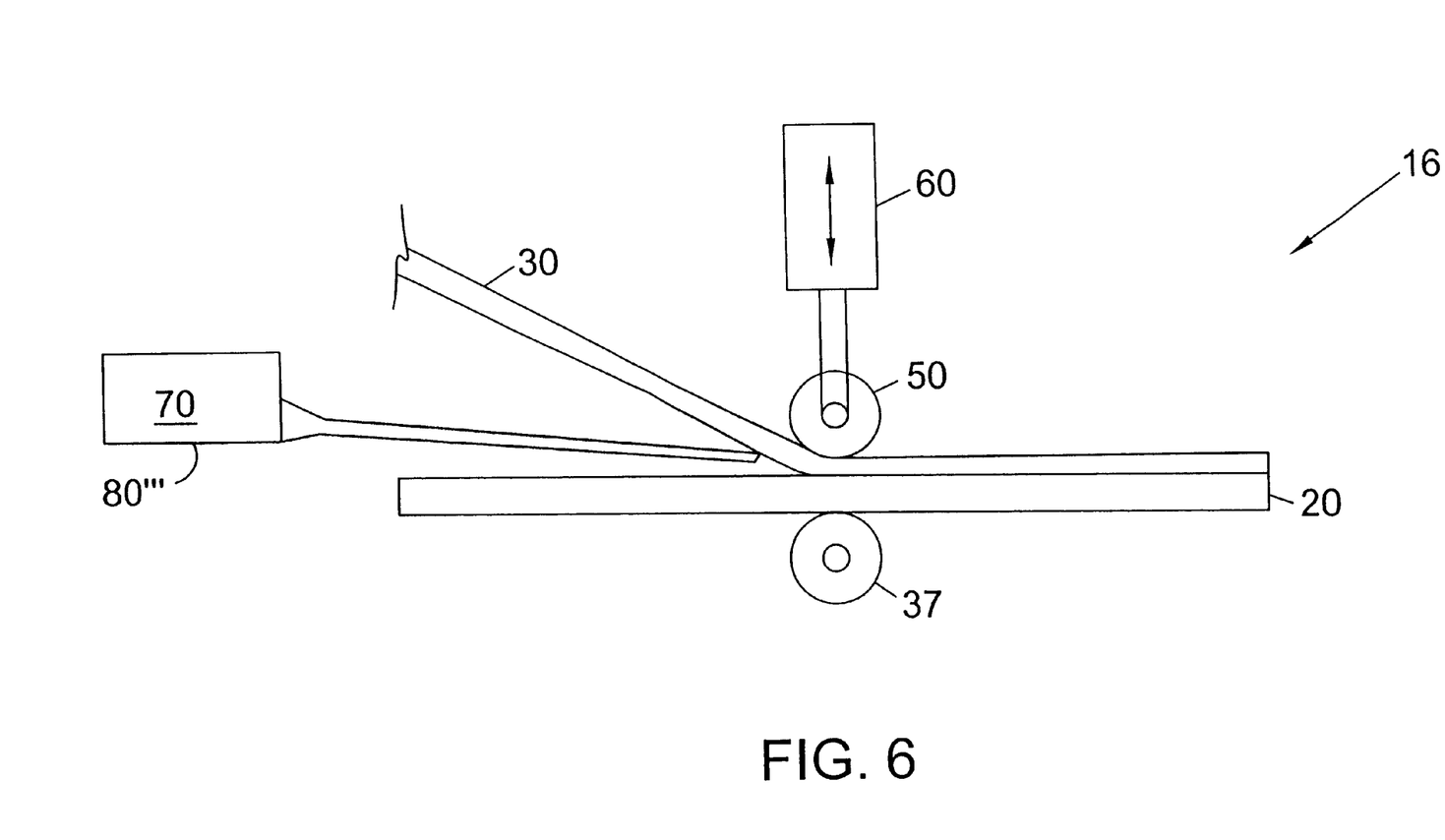
FIG. 6 shows an example of a film welding apparatus and method according to a fifth embodiment of the invention.

Examples of methods for producing solvent welded retarder film stacks include single and double roller systems. Examples of single roller systems are shown in FIGS. 3, 4 and 5. FIG. 6 shows an example of a double roller system. In the single roller system, one roller pinches the film against a table that contains the film stack build-up. In the double roller system, one roller is driven and the second roller pinches the rollers together using, for example, air cylinders.

Using a double roller system, two-ply polycarbonate lamination experiments with several solvents were performed using Nitto-Denko film. In some instances, solvents were discarded because there was no bond formed with zero dilution/solids. In other instances, severe damage to the optical properties occurred at the instant that the solvent came into contact with the film. Such solvents were still considered to be viable, provided that dilution/solids could be added to increase working time. In still other instances, undiluted solvent produced adequate working time to obtain strong bonds with little relaxation in retardation.

Several families of solvents were considered, including but not limited to aliphatic hydrocarbons, alcohols, aromatic hydrocarbons, chlorinated fluorocarbons, amines, ethers, esters, and ketones. Based on the above considerations, ketones and esters were considered to be preferred.

Longer-chain ketones, such as methyl-amyl-ketone (MAK) and methyl-isobutyl ketone (MiBK), show very little loss in retardation and relative insensitivity to lamination rate. Another solvent, MCL-9 (methyl-propyl-ketone, or MPK) is relatively aggressive, with a more significant relaxation in retardation. Laminates with MPK also show the greatest mottle. Other solvents that produce strong bonds include acetone and methyl-ethyl-ketone (MEK). Both solvents are more aggressive and show rapid relaxation in retardation after exposure. In addition, there is greater tendency to form nonuniformities than with the long-chain ketones. Peel strength was high for both of these solvents. Solvents from the ester family exhibit desirable characteristics. Ethyl acetate forms strong bonds but shows significant relaxation.

Retarder stacks that separate color using polarization, rather than thin-film interference, are described in U.S. Pat. No. 5,751,384, which is hereby incorporated by reference in its entirety. Multiple polycarbonate films (6–20) laminated together form units that are theoretically lossless and yield excellent chromatic properties.

As an example, a 16-layer stack is fabricated using a custom single-roller solvent welding laminator similar to that shown in FIG. 3. The solvent used is MAK (methyl-amyl-ketone). The retarder is a polycarbonate film fabricated by Nitto Denko which is a wide view angle 884 nm (NRZ) film. The retarder is supplied with a protective cling mask on either side of the polycarbonate substrate. Each ply of the stack is approximately 60 microns thick, with a nominal retardation of two full waves at 442 nm. The actual mean value has been measured at 440 nm, with a standard deviation of 1.5 nm. Lamination sized pieces are cut at the appropriate angles from either 35×40 cm die cut sheets or from a roll. The angles are generated using custom software based on signal processing algorithms. The stack design that minimizes material waste (small angles parallel/perpendicular to stretching) is selected from the multiple designs generated.

Once lamination sized pieces are cut and sorted, they are cleaned to remove chaff either before or after cling sheet removal. Clean sheets are then input to the solvent welding apparatus. In this example, the dimensions of the laminate are 65 mm×165 mm, and a corner is cut on each sheet to avoid inverting the film. The shot size of solvent is approximately 0.0133 cc of MAK. The roller pressure is 30 psi, the roller diameter is 0.75", and the roller durometer is 55 Shore D.

FIG. 3 shows an example of a film welding apparatus 12 having a vertical translation of the welded stack. In the film welding apparatus 12, a movable backing surface 35 supports the first film 20 while a second film 30 is solvent welded to the first film 20. The first film 20 can be directly on the movable backing surface 35 or on an upper film of a plurality of films. Movable backing surface 35, in this example a rigid plate, and the film 20 (or plurality of films) reciprocates vertically while a pressing roller 50 remains stationary in the vertical direction and horizontally presses the second film 30 onto the first film 20. The second film 30 is delivered to the pressing roller 50 by a film delivery device 40. A solvent 70 is deposited onto the first film 20 by a solvent dispenser 80. As the movable backing surface 35 moves downward in FIG. 3, the second film 30 is delivered to the pressing roller 50 by the film delivery device 40. Horizontal pressure is applied to the second film 30 by the roller positioner 60 through the pressing roller 50. The solvent 70 may be deposited onto the first film 20 at a contact point (or nip) 90 where the second film 30 is pressed against the first film 20, or at a position on the first film 20 away from the contact point 90.

In a preferred embodiment, all of the solvent 70 needed for welding of second film 30 is deposited in one shot onto first film 20 to form a solvent reservoir 85. The movement of movable backing surface 35 is then delayed a predetermined period of time and proceeds at a predetermined rate in order to allow the solvent 70 the proper amount of time to react with first film 20. As discussed below, the proper delay and movement rate depend on how aggressively the solvent dissolves first film 20.

In other embodiments, the solvent 70 is continuously distributed as the movable backing surface moves. In these embodiments, the rate of movement of the movable backing surface and the distance from the contact point 90 that the solvent is deposited depends on how aggressively the solvent dissolves first film 20.

In the example shown in FIG. 3, an optically flat glass plate is used as the backing surface 35 for stack build-up. The glass plate is held in place by vacuum to a one-dimensional DC servo motor translation stage 36. A roller mount 65 holds the pressing roller 50 that is used to press the two films to be welded together. The roller mount 65 is mounted for horizontal translation so that the pressing roller 50 can be moved slightly away from the surface of the film held by the glass plate (or the glass plate itself if the first film is solvent welded to the glass plate). This slight horizontal displacement allows the solvent to spread uniformly across the nip after it is dispensed.

Wavefront distortion of the stack is compromised when films reside between the glass plate and the first film. For instance, both a weak pressure-sensitive adhesive for holding the first film to the glass plate and leaving the cling sheet on the first ply can degrade wavefront quality. To solve these problems, the first film is solvent welded directly to the glass plate. Adhesion to the plate is sufficient to insure that no solvent wicks under the stack during subsequent lamination, yet the stack is easily removed after completion of the stack. When the fabrication of the stack is complete, the vacuum to the glass plate is cut, the glass plate and stack are removed, and a new clean glass plate is inserted. The stack is easily delaminated from the glass plate and transported to an oven to bake out solvent. The used glass plate can then be cleaned and reused.

After the first film, the protective sheet is removed from one or both sides of a subsequent film. The motivation for leaving the cling mask on the back side of the subsequent film during welding is to protect it from abrasion or residual solvent on the pressing roller. However, depending on the uniformity of the mask, and the quality with which it is applied, print through can occur onto the film during welding. For instance, an air bubble between the mask and the film can alter the local solvent distribution and/or pressure distribution. An image of the non-uniformity can be printed onto the film, which can be clearly visible either in reflection or as a hue variation in a polarizing light box. A preferred welder has a self-cleaning pressing roller and/or eliminates residual solvent that emerges from the top of the film stack.

In the example shown in FIG. 3, the film delivery device 40 is mounted at roughly 45° from vertical, opposite the translation stage 36, to feed the film to be welded. During loading, a reference guide 43 is provided on the delivery device 40. A reference stop 45 is provided directly below the glass plate. Ideally, the reference stop 45 location coincides with the axis of the pressing roller 50 at the start position, maximizing yield at the start of the weld by allowing the pressing roller 50 to press at the beginning of the sheet. When the welder is operated, vacuum turns on to hold the film and the guide 43 retracts. The pressing roller 50 then pinches the bottom of the film against the glass plate (backing surface 35).

An arm holding a solvent dispenser (for example by EFD) positions a needle 75 at the center of the nip. An air cylinder pushes the needle 75 into the nip and a predetermined amount of solvent 70 is dispensed as a solvent reservoir 85 between the films (or the first film and the glass plate). After the solvent is dispensed, the vacuum to the film delivery device 40 is turned off to allow the second film 30 to slide relative to the film delivery device 40. The needle 75 is then removed prior to welding. After a predetermined delay in which the solvent 70 spreads across the nip, the translation stage 36 moves downward, pulling the second film 30 across the pressing roller 50, which presses the film against the first film 20 held in position on the glass plate, resulting in the second film 30 being welded to the first film 20. The longer the delay, the greater the damage to the film exposed to the solvent reservoir 85. A guide 42 mounted 200–500 microns above the film delivery device 40 holds the second film 30 down as the second film 30 travels around the pressing roller 50. The closer the guide 42 is mounted to the nip, the later the second film 30 releases from the guide 42. If the second film 30 releases from the guide 42 too early at the end of the weld, there can be significant reduction in yield due to a non-uniform or incomplete weld.

At the conclusion of the welding, the pressing roller 50 retracts and the roller mount 65 moves away from the stack. When the translation stage 36 has returned to the start position, the load cycle begins again. Cycle time to complete one welding, in this example, is under 30 seconds.

After completing the 16 layer stack, the glass plate is removed from the welding apparatus, and the stack is pealed from the glass plate. The stack is then baked for one hour at 50° C. to drive off any residual solvent. The stack is then tested for optical quality. This testing could include, for example, throughput, half-power points, and optical density of the stop band for each of the complementary spectra.

Another embodiment of the invention is a preferred high volume welding apparatus capable of a high degree of solvent control with almost unlimited welding length/width. An example of such an apparatus is shown in FIG. 4. It may be desirable to operate the welder horizontally, rather than vertically. In principle, many of the front-end film manipulations can be combined into a single tool. From a practical standpoint, it may be cost beneficial to separate tasks and to use various combinations of manual and automated operations. In any case, one portion of the process includes a tool that rapidly combines retarder films to form a multilayer stack using solvent welding. The tool may simply rotate rectangular sheets to the appropriate angle for lamination, or it may accept rectangular sheets already cut to the proper angle. The former is simplest, since material can be fed directly from a roll. However, the yield is effectively the area in which all of the sheets overlap, which can be relatively low.

With the input sheets cut, pre-sorted, cling sheet(s) removed, and pre-cleaned, the high volume welder function is to repetitively weld material along one axis. In the event that a cling sheet remains on the roller side during welding, automated cling sheet removal can also be incorporated. At the conclusion of stack fabrication, the substitution of a new lamination plate can also be automated to minimize downtime. Sheet feeding to the welder can be completely automated. With the pressing roller 50 retracted, the bending guide 42 substantially bends the sheet at the bottom. This allows the sheet to be easily pinched to the multi-ply when the pressing roller 50 travels downward. With the pressing roller 50 down, the movable backing surface (mounted to a translation stage) 35 begins to move. A continuous solvent dispenser 80', possibly, for example, based on ink-jet printer head technology, a solvent wick, a fine mist spray, or a roll on applicator, allows the length/width of the laminate to be relatively large. The dispenser 80' should be physically close enough to the pressing roller 50 to account for any limitations in working time imposed by solvent damage. This may affect the physical dimensions of the dispense head. Once the lamination is complete, the pressing roller 50 retracts, the stage returns to the start position, and a new sheet is fed to the welder.

FIG. 5 shows an example of another welding apparatus of the invention. In FIG. 5, welding apparatus 14 supplies the second film 30 in a substantially horizontal direction from supply roll 100 through supply rollers 110. Supply rollers 110 can provide proper tension to the second film 30. Although FIG. 5 shows a supply roll 100, pre-cut sheets of second film 30 could also be used with the apparatus shown in FIG. 5. The solvent 70 is applied to first film 20 by solvent dispenser 80".

FIG. 6 shows a double roller welding apparatus 16. In the double roller welding apparatus 16, the backing surface 35 used in the embodiment shown in FIGS. 3, 4 and 5 is replaced by a backing roller 37. It is preferable that the backing roller 37 is a driven roller that moves the first film 20 horizontally while the pressing roller 50 applies pressure to the second film 30, pressing it against the first film 20. The solvent 70 is applied to the first film 20 by the solvent dispenser 80'''. While FIG. 6 shows pressing roller 50 and backing roller 37 positioned such that the film stack moves horizontally, it should be recognized that roller 50 and backing roller 37 could be positioned so that the film stack moves vertically, as in FIG. 3.

Figure 7:
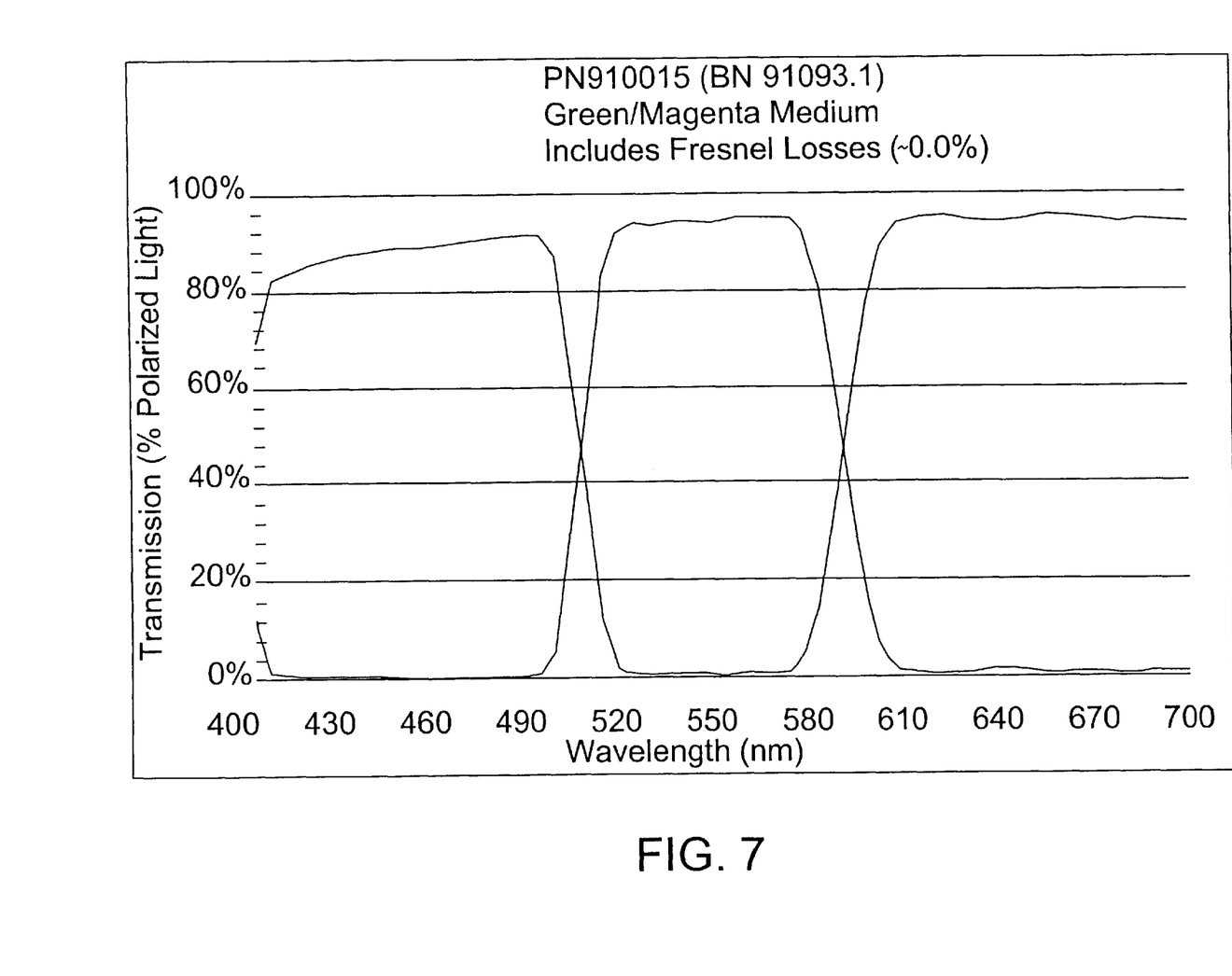
FIG. 7 is a graph showing the measured output of a film stack assembled using pressure-sensitive adhesive.
Figure 8:
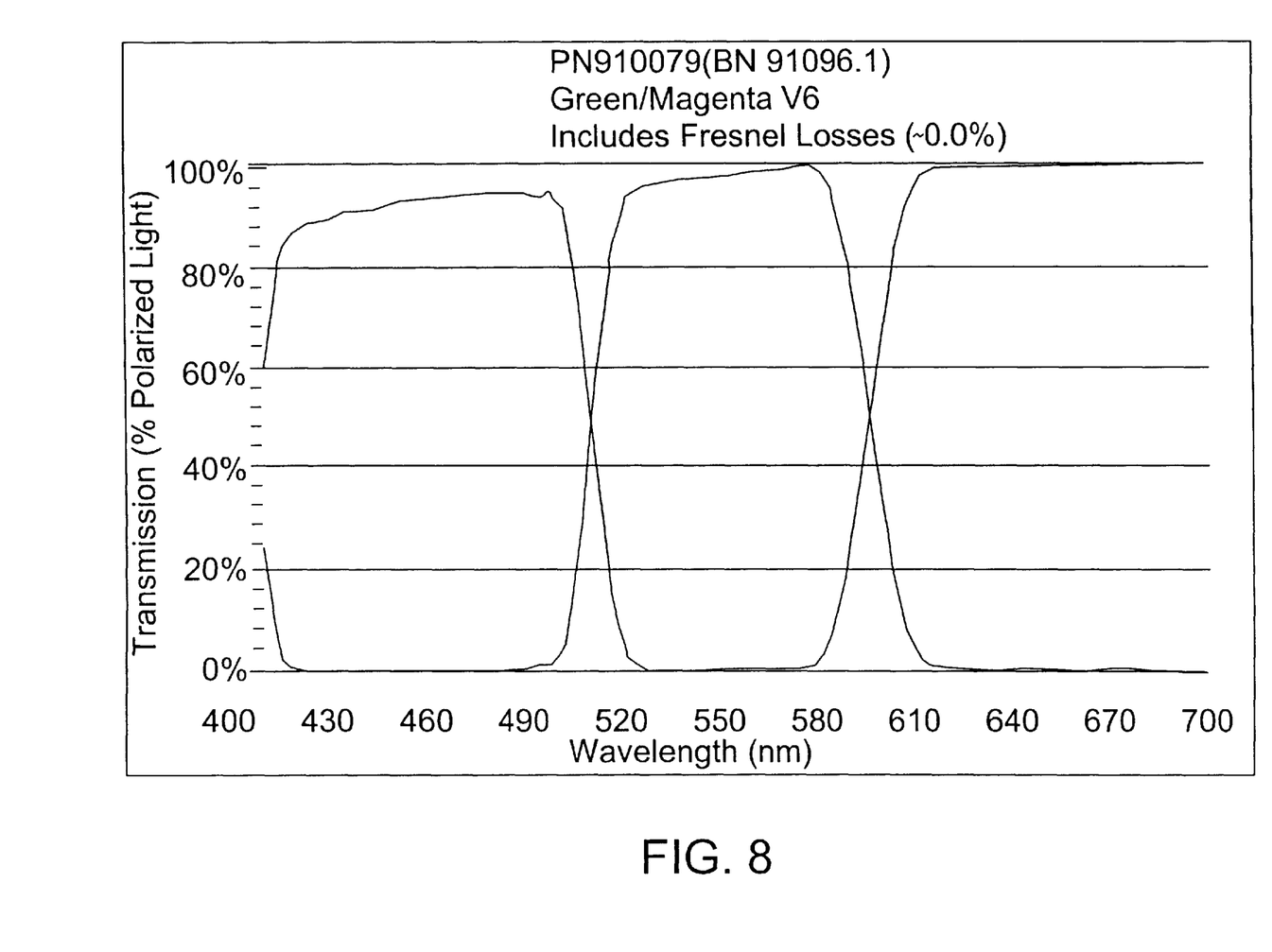
FIG. 8 is a graph showing the measured output of a film stack assembled using solvent welding according to an embodiment of the invention.

FIG. 7 shows measured output of a 16 layer stack assembled using pressure-sensitive adhesives. FIG. 8 shows measured output of the same 16 layer stack, but assembled using solvent welding according to the invention. Comparing FIGS. 7 and 8 shows an example of the increased transmission achieved by solvent welding.

In the welding apparatus described above, the solvent in the solvent reservoir can produce a small shift in retardance change along the length of the weld. In principle, controlling the speed profile during lamination can compensate for this effect (i.e. greater lamination rate at the beginning).

The small but controlled relaxation in retardation from the welding process gives some control in product tolerance. In the event that the tolerance in mean value for retardation of a given film is excessive, slight adjustments in welding process can be used to adjust the welded retardation value. Such a method can be valuable for providing tight specifications on half-power points of a color polarizer.

Another method for making small adjustments in retardation is to apply a slight in-plane stress to the film during the lamination, thereby freezing in a new retardation value. Such a method is well suited to solvent welding, where the bond is formed instantaneously while the films are under tension. Note that in such a process, it is preferable that the stretch direction is similar to the lamination direction.

Various factors effect the ultimate yield from the welding process. Incoming retarder sheets must first be inspected for retardation value and uniformity. Inspection for defects/inclusions must occur after the cling sheets are removed. Retarder stacks are fabricated from either die cut sheets or rolls. The latter is preferable for yield as the material is limited in only one dimension. Typically, the final parts are rectangular, and the stack has a preferred orientation in a system with respect to the edge. This usually precludes selection of an arbitrary bias angle when cutting the sheets to maximize yield. With this constraint, the first step in maximizing yield is to select a design with small angles clustered parallel to an edge. In many cases, signal processing design software generates multiple designs with the same impulse response. These are sorted according to geometrical yield. Geometrical yield refers to the fundamental loss that occurs when a lamination strip is cut at an angle with respect to the cross-web direction.

Depending upon the welding process being used, film cutting can be accomplished using a die cutter, a flat-bed plotter cutter, rotary cutters, or slitting knives. The first of these has dedicated tooling, where the second can be easily programmed for new designs. The flat-bed cutter can cut lamination sized pieces directly, perform more sophisticated cutting (alignment cuts, leaders), and label sheets. The rotary cutter produces rectangular sheets from sequential cuts. Strips are first cut at appropriate angle, followed by 90° cuts as required. Slitting is preferable for cuts that are substantially down-web.

Assume initially that strips of width w are cut cross-web from a roll of width S at an angle θ to the cross-web direction. The yield associated with geometrical loss is given by $$Y = 1 - \frac{w}{2S}\sin 2\theta$$

which calls for a wide web, narrow lamination strips and small angles. As the angle increases, the usable length of the strip increases, but the leader required also grows. The yield for small angles about the cross-web direction is approximately the same as for small angles about the down-web direction.

After cutting strips, the minimum lamination length is given by $$l = S\sqrt{1-(w/S)^2}$$

which occurs when the diagonal of the strip is parallel to the cross-web direction at $$\theta = \cos^{-1}\sqrt{1-(w/S)^2}$$

If this is selected as the lamination length, then a loss occurs for all other sheets in the stack that are not cut at this angle. This loss can be significant if the design calls for several films at large angles. However, lamination length loss is zero for all angles in which the length of the strip is an integer multiple of the lamination length.

Another potential source of loss is associated with the welding step. Damage at the beginning of the weld can occur from the static solvent reservoir and damage at the end of the weld occurs if the film releases too early from the guide. Even small damage along the edges can occur from excess solvent that remains after each weld.

Another geometrical loss is due to the transition between films. This loss is inversely proportional to the number of films cut at each angle, and is therefore relatively small. In addition, the design can be sorted for cutting to further reduce transition loss. For instance, a retarder stack design with angles 6.5°, −1.5°, 5.4°, 5.8°, −7.8°, 20.0°, −12.0°, 10.5°, has minimum loss when the films are laid out for cutting in a fan arrangement, 1.5°, 5.4°, 5.8°, 6.5°, 7.8°, 10.5°, 12.0°, 20.0°. Because there are no pressure-sensitive adhesives pre-applied to the polycarbonate, the films can be flipped, so only one sign of angle need be cut. The transition loss in passing from one film to the next is given by $$L = \frac{1}{2}S^2 \frac{\sin(\theta_1-\theta_2)}{\cos\theta_1\cos\theta_2}$$

If roughly 100 lamination strips are cut at each angle, the design is selected carefully, and the cutting sequence is laid out as above, then this loss is very small.

The remaining loss is associated with final part die cutting. The lamination width is presumed selected to yield an integer number of parts with minimal die cutting loss. Die cut parts are then inspected for defects, representing another loss. An alternative to a die cutter is a guillotine cutter, where rectangular pieces are formed from a sequence of one-dimensional cuts. Defects are associated with debris that is trapped between films during lamination and possibly solvent spatter.

Additional steps that can impact yield include packaging (mounting to glass) or antireflection coating the polymer. Low temperature processes such as dip coating can produce high quality antireflection coatings, allowing stacks of sufficient rigidity to be used in a free-standing mode.

Mounting to glass (ideally) requires an adhesive with a refractive index substantially intermediate between the glass and polycarbonate substrates, with no absorption or haze. The adhesive must have good adhesion to both substrates (possibly with adhesion promoter). The adhesive must be low stress (such as an elastomer) and the process must be such that the stack is not ultimately under stress. The bond must also be sufficiently thick that the adhesive takes up any stress induced due to the different coefficients of thermal expansion of the substrates. Differential stress can be eliminated by forming a sandwich of AR-Glass/Adhesive/PC stack/Adhesive/AR-Glass.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, although the invention has been described in the context of solvent welding polycarbonate retarder stacks, the invention can be used to solvent weld any type of polycarbonate film, particularly polycarbonate films that are to be used in optical applications. Further, the invention can be used to solvent weld other types of films using solvents appropriate for the particular type of films being welded. In the claims, means-plus-function clauses are intended to cover the structures described herein as performing the recited function and not only structural equivalents but also equivalent structures.

What is claimed is:

1. A welded film stack comprising:
   a first film having a first molecular orientation; and
   a second film welded to the first film, wherein the second film welded to the first film has a second molecular orientation different from the first molecular orientation.

2. The stack of claim 1, wherein the first film and the second film are durably welded together.

3. The stack of claim 1, wherein the first film and the second film are bonded together so as to have a high peel strength.

4. The stack of claim 1, wherein the first film and the second film are bonded together so as to form a haze free optical bond.

5. The stack of claim 1, wherein the first film and the second film form a monolithic structure.

6. The stack of claim 1, wherein the first film and the second film have a common boundary that is substantially free from internal reflections.

7. The stack of claim 1, wherein the stack has low specular reflection and haze.

8. The stack of claim 1, wherein the first film is a biaxially stretched film.

9. The stack of claim 1, wherein the second film is glass.

10. The stack of claim 1, wherein the first film and the second film are from the same material.

11. The stack of claim 1, further conspiring one or more additional films that are welded to the stack.

12. The stack of claim 11, wherein the number of the first film, the second film and the one or more additional films totals between 6 and 20 films.

13. The stack of claim 11, wherein the first film and each of the one or more additional films is made from the same material.

14. The stack of claim 1, wherein the first film is welded to the second film with one of an acetone, an aliphatic hydrocarbon, an alcohol, an aromatic hydrocarbon, a chlorinated fluorocarbon, an amine, an ether, an ester, and a ketone solvent.

15. The stack of claim 14, wherein the ketone is one of methyl-amyl-ketone, methyl-propyl-ketone, methyl-ethyl-ketone and methyl-isobutyl-ketone.

16. The stack of claim 1, wherein the stack is one of an achromatic retarder, a achromatic rotator, a compensator, a color polarizer, and a color filter.

17. The stack of claim 1, wherein the first film is directly bonded with the second film.

18. The stack of claim 1, wherein the first film is in direct contact with the second film.

19. The stack of claim 1, wherein
the first film, the second film, and the stack have an optical property,
the optical property of the first film has a first pre-welding value prior to welding,
the optical property of the second film has a second pre-welding value prior to welding,
the optical property of the film stack has a post-welding value after welding, and
the post-welding value is substantially equal to the sum of the first pre-welding value and the second pre-welding value.

20. The film stack of claim 19, wherein the optical property is low wavefront distortion.

21. The stack of claim 19, wherein the optical property is optical efficiency.

22. A solvent welded retarder stack comprising:
a plurality of polycarbonate retarder films,
wherein solvent welding bonds at least two of the plurality of polycarbonate films using a low temperature process.

23. The stack of claim 22, wherein the solvent welding is performed by a ketone.

24. The stack of claim 23, wherein the ketone is methyl-amyl-ketone.

25. The stack of claim 22, wherein the stack provides color filtering.

26. The stack of claim 22, wherein the films are made from the same material.

27. A stack according to claim 1, wherein the second film is solvent welded to the first film.

28. A stack according to claim 1, wherein one of the first molecular orientation and the second molecular orientation is substantially unoriented.

29. A stack according to claim 1, wherein one of the first film and the second film is a polarizer.

30. A stack according to claim 1, wherein the first film is one of a retarder film, a polycarbonate film, or a polycarbonate retarder film.

31. A stack according to claim 1, wherein the second film is one of a retarder film, a polycarbonate film, or a polycarbonate retarder film.

32. A stack according to claim 1, wherein at least one of the first film and the second film has been stretched to impose its respective molecular orientation upon it.

33. A stack according to claim 22, wherein the low temperature process is a dip coating process.

34. A stack according to claim 22, wherein the at least two of the plurality of polycarbonate films are bonded together so as to form a haze free optical bond.

35. A stack according to claim 22, wherein the at least two of the plurality of polycarbonate films form a monolithic structure.

36. A stack according to claim 22, wherein the at least two of the plurality of polycarbonate films have a common boundary that is substantially free from internal reflections.

37. A stack according to claim 22, wherein the stack has low specular reflection and haze.

38. A stack according to claim 22, wherein the plurality of polycarbonate retarder films include between 6 and 20 polycarbonate retarder films.

39. A stack according to claim 22, wherein the at least two of the plurality of polycarbonate films are welded with one of an acetone, an aliphatic hydrocarbon, an alcohol, an aromatic hydrocarbon, a chlorinated fluorocarbon, an amine, an ether, an ester, and a ketone solvent.

40. A stack according to claim 39, wherein the ketone is one of methyl-amyl-ketone, methyl-propyl-ketone, methyl-ethyl-ketone and methyl-isobutyl-ketone.

41. A stack according to claim 22, wherein the stack is one of an achromatic retarder, a achromatic rotator, a compensator, a color polarizer, and a color filter.

42. A stack according to claim 22, wherein the at least two of the plurality of polycarbonate films are directly bonded with each other.

43. A stack according to claim 22, wherein the at least two of the plurality of polycarbonate films are in direct contact with each other.

44. A stack according to claim 22, wherein
the plurality of polycarbonate films have an optical property,
the optical property of each one of the plurality of polycarbonate films have a pre-welding value prior to welding,
the optical property of the stack has a post-welding value after welding, and
the post-welding value is substantially equal to the sum of the pre-welding values of the each one of the plurality of polycarbonate films.

45. The film stack of claim 44, wherein the optical property is low wavefront distortion.

46. A stack according to claim 44, wherein the optical property is optical efficiency.

47. A stack according to claim 22, wherein the at least two of the plurality of polycarbonate films have different molecular orientations relative to each other.

48. A stack according to claim 47, wherein the molecular orientation of at least one of the at least two polycarbonate films is substantially unoriented.

49. A stack according to claim 22, wherein one of the at least two of the plurality of polycarbonate films is a polarizer.

50. A stack according to claim 11, wherein the first film is one of a retarder film, a polycarbonate film, or a polycarbonate retarder film.

51. A stack according to claim 11, wherein the second film is one of a retarder film, a polycarbonate film, or a polycarbonate retarder film.

52. A stack according to 11, wherein at least one of the first film and the second film has been stretched to impose its respective molecular orientation upon it.

* * * * *

UNITED STATES PATENT AND TRADEMARK OFFICE
CERTIFICATE OF CORRECTION

PATENT NO. : 6,638,583 B1
DATED : October 28, 2003
INVENTOR(S) : Sharp et al.

It is certified that error appears in the above-identified patent and that said Letters Patent is hereby corrected as shown below:

Title page,
Insert Item -- [60], Related U.S. Application Data, Provisional application No. 60/189,883, filed March 16, 2000 --;

Column 11,
Line 21, delete "conspiring", and insert in lieu thereof -- comprising --;

Column 14,
Line 7, delete "11", and insert in lieu thereof -- claim 11 --.

Signed and Sealed this

Twenty-eighth Day of September, 2004

JON W. DUDAS
*Director of the United States Patent and Trademark Office*